(12) United States Patent
Bunker (10) Patent No.: US 9,435,208 B2
(45) Date of Patent: Sep. 6, 2016

(54) COMPONENTS WITH MICROCHANNEL COOLING

(75) Inventor: Ronald Scott Bunker, Waterford, NY (US)

(73) Assignee: General Electric Company, Niskayuna, NY (US)

( * ) Notice: Subject to any disclaimer, the term of this patent is extended or adjusted under 35 U.S.C. 154(b) by 1030 days.

(21) Appl. No.: 13/448,469

(22) Filed: Apr. 17, 2012

(65) Prior Publication Data

US 2013/0272850 A1 Oct. 17, 2013

(51) Int. Cl.
F01D 5/18 (2006.01)
F01D 5/14 (2006.01)
B23P 15/04 (2006.01)

(52) U.S. Cl.
CPC ............ *F01D 5/147* (2013.01); *F01D 5/186* (2013.01); *F01D 5/189* (2013.01); *B23P 15/04* (2013.01); *F05D 2230/30* (2013.01); *F05D 2230/90* (2013.01); *F05D 2260/204* (2013.01); *Y02T 50/672* (2013.01); *Y02T 50/673* (2013.01); *Y02T 50/676* (2013.01); *Y10T 29/49229* (2015.01)

(58) Field of Classification Search
CPC .... F01D 5/186; F01D 5/187; F05D 2230/10; F05D 2230/30; F05D 2230/31; F05D 2230/311; F05D 2230/312; F05D 2230/313; F05D 2230/90; F05D 2260/204; Y10T 29/49339; Y10T 29/49341; B23P 15/04
USPC ........ 415/115; 416/96 R, 96 A, 97 R, 241 R, 416/241 B; 29/889.7, 889.71, 889.72, 29/889.721, 889.722
See application file for complete search history.

(56) References Cited

U.S. PATENT DOCUMENTS

| 4,303,374 | A | | 12/1981 | Braddy |
| 5,263,820 | A | | 11/1993 | Tubbs |
| 5,626,462 | A | * | 5/1997 | Jackson et al. ............. 416/97 R |
| 6,102,658 | A | | 8/2000 | Kvasnak et al. |
| 6,126,397 | A | | 10/2000 | Kvasnak et al. |

(Continued)

FOREIGN PATENT DOCUMENTS

| EP | 2336493 A2 | 6/2011 |
| EP | 2381070 A2 | 10/2011 |

OTHER PUBLICATIONS

EP Search Report and Written Opinion issued Apr. 14, 2014 in connection with corresponding EP Patent Application No. 13163261.4.

(Continued)

*Primary Examiner* — Christopher Verdier
(74) *Attorney, Agent, or Firm* — Ann M. Agosti (57) ABSTRACT

A component includes a substrate having outer and inner surfaces, where the inner surface defines at least one hollow, interior space. The outer surface defines pressure side and suction side walls, which are joined together at leading and trailing edges of the component. The outer surface defines one or more grooves that extend at least partially along the pressure or suction side walls in a vicinity of the trailing edge. Each groove is in fluid communication with a respective hollow, interior space. The component further includes a coating disposed over at least a portion of the outer substrate surface. The coating comprises at least a structural coating that extends over the groove(s), such that the groove (s) and the structural coating together define one or more channels for cooling the trailing edge. A method of forming cooling channels in the vicinity of the trailing edge is also provided.

13 Claims, 4 Drawing Sheets

(56) References Cited

U.S. PATENT DOCUMENTS

| | | | |
|---|---|---|---|
| 6,241,466 B1 | 6/2001 | Tung et al. | |
| 6,709,230 B2* | 3/2004 | Morrison | F01D 5/189 415/115 |
| 7,549,844 B2 | 6/2009 | Liang | |
| 7,625,180 B1* | 12/2009 | Liang | 416/97 R |
| 8,360,726 B1* | 1/2013 | Liang | F01D 5/187 416/241 R |
| 2002/0141870 A1 | 10/2002 | Schafrik et al. | |
| 2004/0151586 A1 | 8/2004 | Chlus et al. | |
| 2005/0244264 A1 | 11/2005 | Jacks et al. | |
| 2006/0269410 A1 | 11/2006 | Downs et al. | |
| 2007/0280832 A1 | 12/2007 | Liang | |
| 2008/0050243 A1* | 2/2008 | Liang | F01D 5/187 416/97 R |
| 2010/0074762 A1* | 3/2010 | Liang | 416/97 R |
| 2011/0146075 A1* | 6/2011 | Hazel et al. | 29/889.71 |
| 2011/0189015 A1* | 8/2011 | Shepherd | F01D 5/186 416/95 |
| 2011/0259017 A1* | 10/2011 | Lacy et al. | 60/806 |
| 2012/0036858 A1 | 2/2012 | Lacy et al. | |
| 2012/0111545 A1* | 5/2012 | Bunker | B23P 15/04 165/133 |
| 2012/0114868 A1* | 5/2012 | Bunker | B23P 15/04 427/448 |
| 2012/0114912 A1* | 5/2012 | Bunker et al. | 428/173 |
| 2012/0148769 A1* | 6/2012 | Bunker | B23P 15/04 428/34.1 |
| 2012/0255870 A1* | 10/2012 | Rebak | F01D 5/147 205/670 |
| 2012/0276308 A1* | 11/2012 | Rebak | F01D 5/184 428/34.1 |

OTHER PUBLICATIONS

Unofficial English Translation of Chinese Office Action issued in connection with corresponding CN Application No. 201310133838.3 on Jun. 3, 2015.

* cited by examiner

COMPONENTS WITH MICROCHANNEL COOLING

BACKGROUND

The invention relates generally to gas turbine engines, and, more specifically, to micro-channel cooling therein.

In a gas turbine engine, air is pressurized in a compressor and mixed with fuel in a combustor for generating hot combustion gases. Energy is extracted from the gases in a high pressure turbine (HPT), which powers the compressor, and in a low pressure turbine (LPT), which powers a fan in a turbofan aircraft engine application, or powers an external shaft for marine and industrial applications.

Engine efficiency increases with temperature of combustion gases. However, the combustion gases heat the various components along their flowpath, which in turn requires cooling thereof to achieve a long engine lifetime. Typically, the hot gas path components are cooled by bleeding air from the compressor. This cooling process reduces engine efficiency, as the bled air is not used in the combustion process.

Gas turbine engine cooling art is mature and includes numerous patents for various aspects of cooling circuits and features in the various hot gas path components. For example, the combustor includes radially outer and inner liners, which require cooling during operation. Turbine nozzles include hollow vanes supported between outer and inner bands, which also require cooling. Turbine rotor blades are hollow and typically include cooling circuits therein, with the blades being surrounded by turbine shrouds, which also require cooling. The hot combustion gases are discharged through an exhaust which may also be lined, and suitably cooled.

In all of these exemplary gas turbine engine components, thin walls of high strength superalloy metals are typically used to reduce component weight and minimize the need for cooling thereof. Various cooling circuits and features are tailored for these individual components in their corresponding environments in the engine. For example, a series of internal cooling passages, or serpentines, may be formed in a hot gas path component. A cooling fluid may be provided to the serpentines from a plenum, and the cooling fluid may flow through the passages, cooling the hot gas path component substrate and any associated coatings. However, this cooling strategy typically results in comparatively low heat transfer rates and non-uniform component temperature profiles.

In particular the airfoil trailing edge region is traditionally difficult to adequately cool, while also satisfying the need for a thin, aerodynamic trailing edge profile. Conventional approaches to cooling the trailing edge region include drilling cooling holes through the cast metal centerline directly out the trailing edge base. However, this approach necessitates a thicker trailing edge than would otherwise be desirable. Another approach is to cast a pressure side bleed slot configuration. However, this second approach can lead to ceramic core issues, as well as to casting yields that may be lower than desired.

It would therefore be desirable to provide improved cooling in the trailing edge region without resorting to undesirably thick trailing edges and without negatively impacting casting yields.

BRIEF DESCRIPTION

One aspect of the present invention resides in a component that includes a substrate having an outer surface and an inner surface, where the inner surface defines at least one hollow, interior space, and where the outer surface of the substrate defines a pressure side wall and a suction side wall. The pressure and suction side walls are joined together at a leading edge and at a trailing edge of the component. The outer surface defines one or more grooves that extend at least partially along the pressure or suction side walls in a vicinity of the trailing edge of the component. Each groove is in fluid communication with a respective hollow, interior space. The component further includes a coating disposed over at least a portion of the outer surface of the substrate. The coating comprises at least a structural coating, where the structural coating extends over the groove(s), such that the groove(s) and the structural coating together define one or more channels for cooling the trailing edge of the component.

Another aspect of the invention resides in a method of forming cooling channels in a vicinity of a trailing edge of a component that includes a substrate having an outer surface and an inner surface, where the inner surface defines at least one hollow, interior space, where the outer surface of the substrate defines a pressure side wall and a suction side wall. The pressure and suction side walls are joined together at a leading edge and at the trailing edge of the component The method includes forming at least one groove in the outer surface of the substrate that extends at least partially along the pressure or suction side walls in the vicinity of the trailing edge of the component, and forming at least one access hole in the substrate, wherein each access hole is formed through the base of a respective one of the groove(s), to connect the groove in fluid communication with the respective hollow interior space. The method further includes disposing a coating over at least a portion of the outer surface of the substrate, where the coating comprises at least a structural coating, where the structural coating extends over the groove(s), such that the groove(s) and the structural coating together define one or more channels for cooling the trailing edge of the component.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The modifier "about" used in connection with a quantity is inclusive of the stated value, and has the meaning dictated by context, (e.g., includes the degree of error associated with measurement of the particular quantity). In addition, the term "combination" is inclusive of blends, mixtures, alloys, reaction products, and the like.

Moreover, in this specification, the suffix "(s)" is usually intended to include both the singular and the plural of the term that it modifies, thereby including one or more of that term (e.g., "the passage hole" may include one or more passage holes, unless otherwise specified). Reference throughout the specification to "one embodiment," "another embodiment," "an embodiment," and so forth, means that a particular element (e.g., feature, structure, and/or characteristic) described in connection with the embodiment is included in at least one embodiment described herein, and may or may not be present in other embodiments. Similarly, reference to "a particular configuration" means that a particular element (e.g., feature, structure, and/or characteristic) described in connection with the configuration is included in at least one configuration described herein, and may or may not be present in other configurations. In addition, it is to be understood that the described inventive features may be combined in any suitable manner in the various embodiments and configurations.

Figure 1:
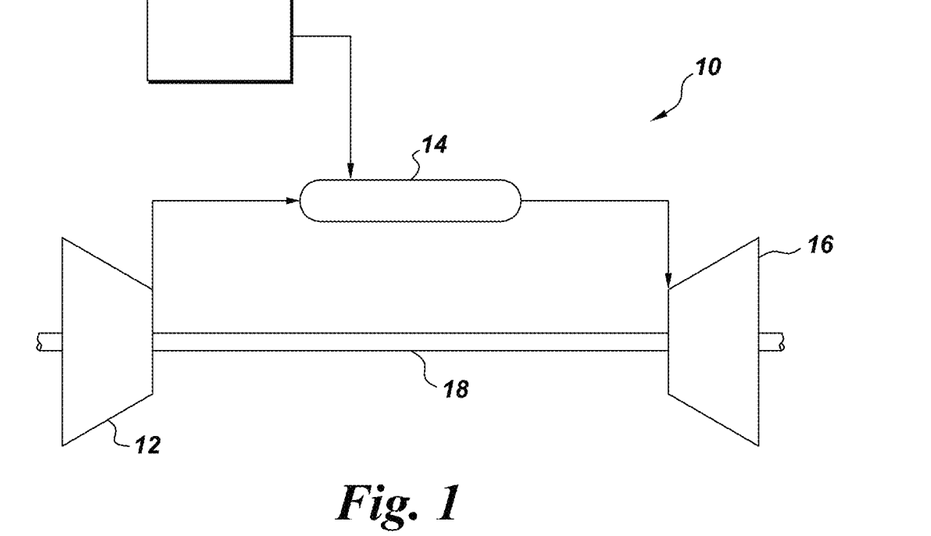
FIG. 1 is a schematic illustration of a gas turbine system.
Figure 2:
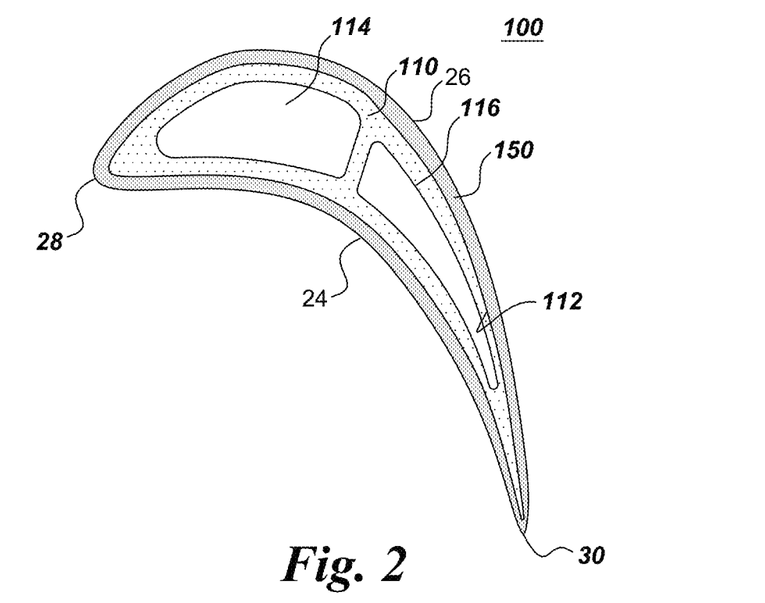
FIG. 2 is a schematic cross-section of an example airfoil configuration.

FIG. 1 is a schematic diagram of a gas turbine system 10. The system 10 may include one or more compressors 12, combustors 14, turbines 16, and fuel nozzles 20. The compressor 12 and turbine 16 may be coupled by one or more shaft 18. The shaft 18 may be a single shaft or multiple shaft segments coupled together to form shaft 18.

The gas turbine system 10 may include a number of hot gas path components 100. A hot gas path component is any component of the system 10 that is at least partially exposed to a high temperature flow of gas through the system 10. For example, bucket assemblies (also known as blades or blade assemblies), nozzle assemblies (also known as vanes or vane assemblies), shroud assemblies, transition pieces, retaining rings, and compressor exhaust components are all hot gas path components. However, it should be understood that the hot gas path component 100 of the present invention is not limited to the above examples, but may be any component that is at least partially exposed to a high temperature flow of gas. Further, it should be understood that the hot gas path component 100 of the present disclosure is not limited to components in gas turbine systems 10, but may be any piece of machinery or component thereof that may be exposed to high temperature flows.

When a hot gas path component 100 is exposed to a hot gas flow, the hot gas path component 100 is heated by the hot gas flow and may reach a temperature at which the hot gas path component 100 is substantially degraded or fails. Thus, in order to allow system 10 to operate with hot gas flow at a high temperature, increasing the efficiency, performance and/or life of the system 10, a cooling system for the hot gas path component 100 is required.

Micro-channel cooling has the potential to significantly reduce cooling requirements by placing the cooling as close as possible to the heated region, thus reducing the temperature difference between the hot side and cold side of the main load bearing substrate material for a given heat transfer rate.

In general, the cooling system of the present disclosure includes a series of small channels, or micro-channels, formed in the surface of the hot gas path component 100. For industrial sized power generating turbine components, "small" or "micro" channel dimensions would encompass approximate depths and widths in the range of 0.25 mm to 1.5 mm, while for aviation sized turbine components channel dimensions would encompass approximate depths and widths in the range of 0.1 mm to 0.5 mm. The hot gas path component may be provided with a protective coating. A cooling fluid may be provided to the channels from a plenum, and the cooling fluid may flow through the channels, cooling the hot gas path component.

A component 100 is described with reference to FIGS. 2-9. As indicated, for example, in FIGS. 2 and 3, the component 100 includes a substrate 110 having an outer surface 112 and an inner surface 116. As indicated for example in FIGS. 2 and 3, the inner surface 116 defines at least one hollow, interior space 114. As indicated, for example in FIGS. 2 and 3, the outer surface 112 of the substrate 110 defines a pressure side wall 24 and a suction side wall 26, where the pressure and suction side walls 24, 26 are joined together at a leading edge 28 and at a trailing edge 30 of the component (100). As shown in FIG. 1, the suction side wall 26 is convex-shaped and pressure side wall 24 is concave-shaped.

Figure 3:
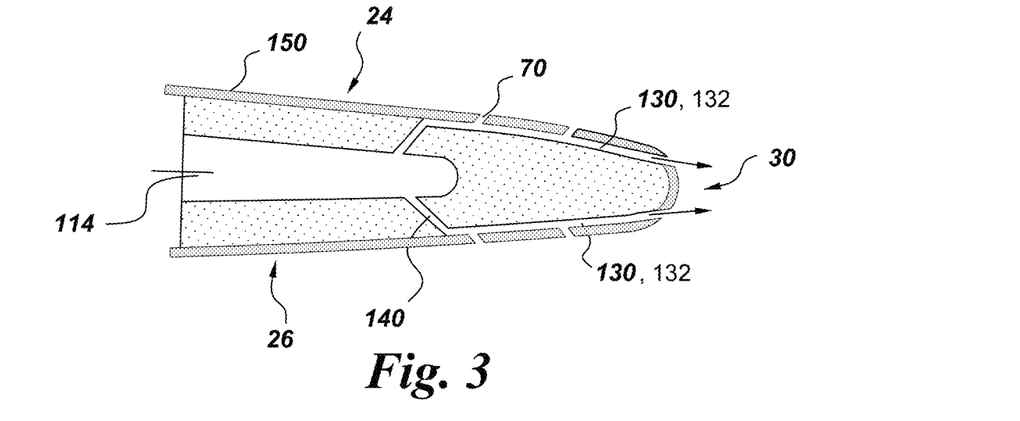
FIG. 3 schematically depicts, in cross-sectional view, an arrangement for cooling the trailing edge of an airfoil, with cooling channels on both the pressure and suction side walls.

As indicated, for example in FIG. 3, the outer surface 112 defines one or more grooves 132, where each groove 132 extends at least partially along the pressure or suction side walls 24, 26 in a vicinity of the trailing edge 30 of the component 100. As used here, the "vicinity of the trailing edge 30" should be understood to mean being within thirty percent of the surface length of the substrate from the trailing edge, as measured on either side of the substrate between the leading and trailing edges. It should be noted that although FIG. 3, shows the outlet of the cooling channels being at the trailing edge 30 of the component, the outlet need only be in the vicinity of the trailing edge. As indicated in FIG. 3, for example, each groove 132 is in fluid communication with a respective hollow, interior space 114.

Typically, the substrate 110 is cast prior to forming the groove(s) 132. As discussed in U.S. Pat. No. 5,626,462, Melvin R. Jackson et al., "Double-wall airfoil," which is incorporated herein in its entirety, substrate 110 may be formed from any suitable material. Depending on the intended application for component 100, this could include Ni-base, Co-base and Fe-base superalloys. The Ni-base superalloys may be those containing both γ and γ' phases, particularly those Ni-base superalloys containing both γ and γ' phases wherein the γ' phase occupies at least 40% by volume of the superalloy. Such alloys are known to be advantageous because of a combination of desirable properties including high temperature strength and high temperature creep resistance. The substrate material may also comprise a NiAl intermetallic alloy, as these alloys are also known to possess a combination of superior properties including high temperature strength and high temperature creep resistance that are advantageous for use in turbine engine applications used for aircraft. In the case of Nb-base alloys, coated Nb-base alloys having superior oxidation resistance will be preferred, particularly those alloys comprising Nb-(27-40)Ti-(4.5-10.5)Al-(4.5-7.9)Cr-(1.5-5.5)Hf-(0-6)V, where the composition ranges are in atom percent. The substrate material may also comprise a Nb-base alloy that contains at least one secondary phase, such as a Nb-containing intermetallic compound comprising a silicide, carbide or boride. Such alloys are composites of a ductile phase (i.e., the Nb-base alloy) and a strengthening phase (i.e., a Nb-containing intermetallic compound). For other arrangements, the substrate material comprises a molybdenum based alloy, such as alloys based on molybdenum (solid solution) with $Mo_5SiB_2$ and $Mo_3Si$ second phases. For other configurations, the substrate material comprises a ceramic matrix composite, such as a silicon carbide (SiC) matrix reinforced with SiC fibers. For other configurations the substrate material comprises a TiAl-based intermetallic compound.

The grooves 132 may be formed using a variety of techniques. Example techniques for forming the groove(s) 132 include abrasive liquid jet, plunge electrochemical machining (ECM), electric discharge machining (EDM) with a spinning electrode (milling EDM), and laser machining Example laser machining techniques are described in commonly assigned, U.S. Pat. No. 8,857,055, "Process and system for forming shaped air holes" filed Jan. 29, 2010, which is incorporated by reference herein in its entirety. Example EDM techniques are described in commonly assigned U.S. Pat. No. 8,905,713, "Articles which include chevron film cooling holes, and related processes," filed May 28, 2010, which is incorporated by reference herein in its entirety.

For particular processes, the grooves are formed using an abrasive liquid jet (not shown). Example water jet drilling processes and systems are disclosed in commonly assigned U.S. Pat. No. 8,905,713. As explained in U.S. Pat. No. 8,905,713, the water jet process typically utilizes a high-velocity stream of abrasive particles (e.g., abrasive "grit"), suspended in a stream of high pressure water. The pressure of the water may vary considerably, but is often in the range of about 35-620 MPa. A number of abrasive materials can be used, such as garnet, aluminum oxide, silicon carbide, and glass beads. Beneficially, the capability of abrasive liquid jet machining techniques facilitates the removal of material in stages to varying depths, with control of the shaping. For example, this allows the interior access holes 140 (described below with reference to FIGS. 3-6) feeding the channel to be drilled either as a straight hole of constant cross section, a shaped hole (elliptical etc.), or a converging or diverging hole.

In addition, and as explained in U.S. Pat. No. 8,905,713, the water jet system can include a multi-axis computer numerically controlled (CNC) unit (not shown). The CNC systems themselves are known in the art, and described, for example, in U.S. Pat. No. 7,351,290 (S. Rutkowski et al), which is incorporated herein by reference. CNC systems allow movement of the cutting tool along a number of X, Y, and Z axes, as well as rotational axes.

Figure 10:
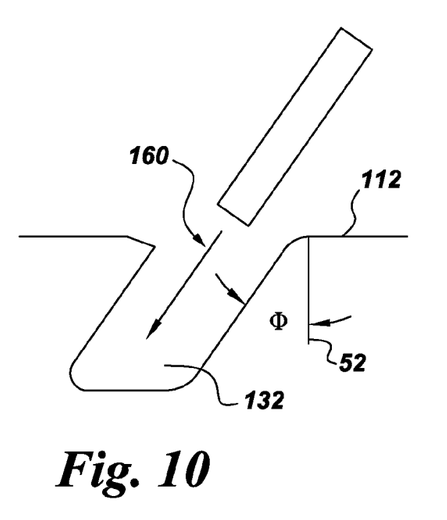
FIG. 10 illustrates a first pass of an abrasive liquid jet at an angle φ for forming a re-entrant groove.
Figure 11:
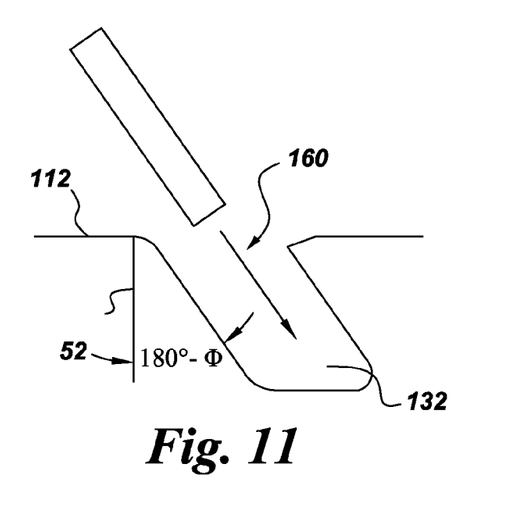
FIG. 11 illustrates a second pass of the abrasive liquid jet at an opposite angle 180-φ for forming the re-entrant groove.
Figure 12:
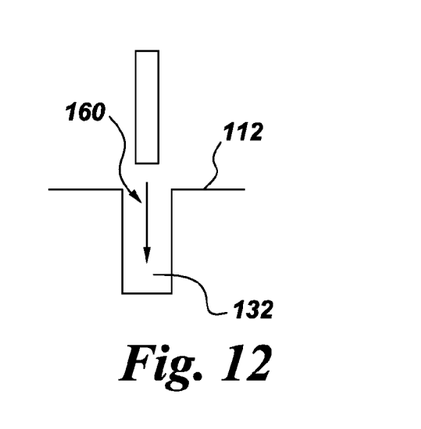
FIG. 12 illustrates an optional third pass of the abrasive liquid jet normal to the groove, for forming the re-entrant groove.

More particularly and as shown in FIGS. 10-12, each groove 132 may be formed by directing an abrasive liquid jet 160 at a lateral angle relative to the surface 112 of the substrate 110 in a first pass of the abrasive liquid jet 160 (FIG. 10) and then making a subsequent pass at an angle substantially opposite to that of the lateral angle (FIG. 11), such that each groove narrows at the opening 136 of the groove and thus comprises a re-entrant shaped groove (as discussed below with reference to FIG. 6). Typically, multiple passes will be performed to achieve the desired depth and width for the groove. This technique is described in commonly assigned, U.S. Pat. No. 8,387,245, Bunker et al., "Components with re-entrant shaped cooling channels and methods of manufacture," which is incorporated by reference herein in its entirety. In addition, the step of forming the re-entrant shaped grooves 132 may further comprise performing an additional pass where the abrasive liquid jet is directed toward the base 134 of the groove 132 at one or more angles between the lateral angle and a substantially opposite angle, such that material is removed from the base 134 of the groove 132.

Referring now to FIGS. 2, 3, 7, and 8, the component 100 further includes a coating 150 that is disposed over at least a portion of the outer surface 112 of the substrate 110. As indicated, for example in FIG. 8, the coating 150 comprises at least a structural coating 54. Coating 150 comprises a suitable material and is bonded to the component. For the example arrangement shown in FIG. 7, the structural coating 54 extends over the groove(s) 132, such that the groove(s) 132 and the structural coating 54 together define one or more channels 130 for cooling the training edge 30 of the component 100.

For particular configurations, the coating 150 has a thickness in the range of 0.1-2.0 millimeters, and more particularly, in the range of 0.2 to 1 millimeters, and still more particularly 0.2 to 0.5 millimeters for industrial components. For aviation components, this range is typically 0.1 to 0.25 millimeters. However, other thicknesses may be utilized depending on the requirements for a particular component 100.

The coating 150 comprises structural coating layers and may further include optional additional coating layer(s). The coating layer(s) may be deposited using a variety of techniques. For particular processes, the structural coating layer (s) are deposited by performing an ion plasma deposition (cathodic arc). Example ion plasma deposition apparatus and method are provided in commonly assigned, U.S. Pat. No. 7,879,203, Weaver et al, "Method and apparatus for cathodic arc ion plasma deposition," which is incorporated by reference herein in its entirety. Briefly, ion plasma deposition comprises placing a consumable cathode formed of a coating material into a vacuum environment within a vacuum chamber, providing a substrate 110 within the vacuum environment, supplying a current to the cathode to form a cathodic arc upon a cathode surface resulting in arc-induced erosion of coating material from the cathode surface, and depositing the coating material from the cathode upon the substrate surface 112.

Non-limiting examples of a coating deposited using ion plasma deposition include structural coatings, as well as bond coatings and oxidation-resistant coatings, as discussed in greater detail below with reference to U.S. Pat. No.

5,626,462, Jackson et al., "Double-wall airfoil." For certain hot gas path components 100, the structural coating comprises a nickel-based or cobalt-based alloy, and more particularly comprises a superalloy or a (Ni,Co)CrAlY alloy. For example, where the substrate material is a Ni-base superalloy containing both γ and γ' phases, structural coating may comprise similar compositions of materials, as discussed in greater detail below with reference to U.S. Pat. No. 5,626,462.

For other process configurations, a structural coating is deposited by performing at least one of a thermal spray process and a cold spray process. For example, the thermal spray process may comprise combustion spraying or plasma spraying, the combustion spraying may comprise high velocity oxygen fuel spraying (HVOF) or high velocity air fuel spraying (HVAF), and the plasma spraying may comprise atmospheric (such as air or inert gas) plasma spray, or low pressure plasma spray (LPPS, which is also known as vacuum plasma spray or VPS). In one non-limiting example, a (Ni,Co)CrAlY coating is deposited by HVOF or HVAF. Other example techniques for depositing the structural coating include, without limitation, sputtering, electron beam physical vapor deposition, electroless plating, and electroplating.

For certain configurations, it is desirable to employ multiple deposition techniques for depositing structural and optional additional coating layers. For example, a first structural coating layer may be deposited using an ion plasma deposition, and a subsequently deposited layer and optional additional layers (not shown) may be deposited using other techniques, such as a combustion spray process or a plasma spray process. Depending on the materials used, the use of different deposition techniques for the coating layers may provide benefits in properties, such as, but not restricted to strain tolerance, strength, adhesion, and/or ductility.

Figure 7:
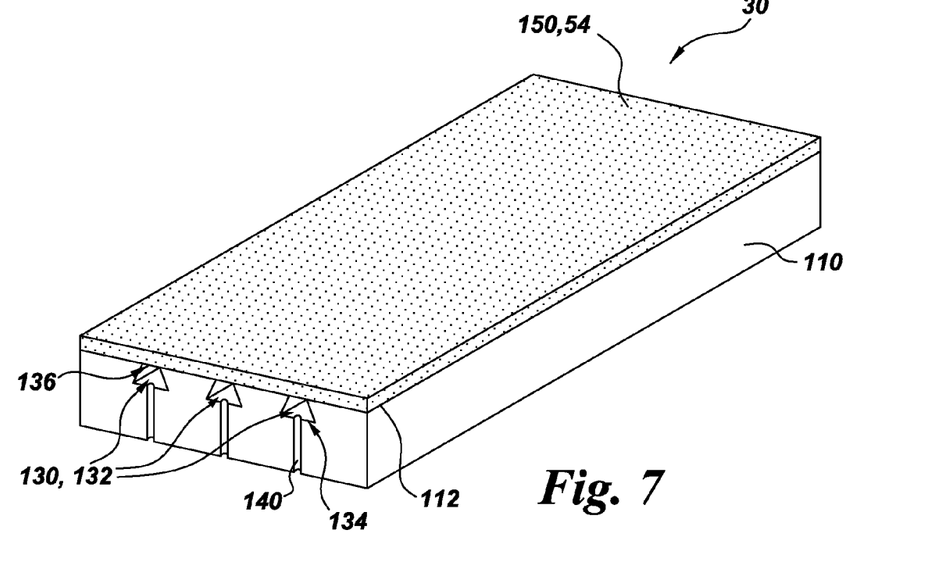
FIG. 7 schematically depicts, in perspective view, three example micro-channels that extend partially along the surface of the substrate and channel coolant to the trailing edge of the airfoil.

For the configurations shown in FIGS. 3 and 7, the component comprises a turbine airfoil 100 (for use in a turbine blade or vane, for example), and the substrate 110 further defines at least one access channel 140 that extends between and provides fluid communication between a respective hollow, interior space 114 (FIG. 3) and at least one cooling channel 130. As indicated in FIG. 7, for example, the respective access channel 140 intersects the base 134 of the respective cooling channel 130. The interior access holes 140 supplying the respective cooling channels may be drilled either as a straight hole of constant cross section, a shaped hole (elliptical etc.), or a converging or diverging hole. Methods for forming the access holes are provided in commonly assigned U.S. Patent Publication No. 20130043009, Ronald S. Bunker et al., "Components with cooling channels and methods of manufacture," which is incorporated by reference herein in its entirety.

In addition to the cooling channels 130 described above, film holes 70 may be formed through the coating 150, as indicated for example in FIG. 3. Commonly assigned U.S. Pat. No. 8,727,727, Bunker et al., "Components with cooling channels and methods of manufacture," discloses techniques for forming film holes using trenches that cut directly over the cooling channel region, thereby eliminating the need for precision location of individual film holes. Beneficially, the addition of film holes provides film cooling, in addition to the microchannel cooling to further cool the component. Although not expressly shown, conventional film cooling holes may also be incorporated, where the film cooling holes extend from the hollow interior region(s) 114 through the substrate 110 (component walls) directly.

There are a number of possible arrangements for the cooling channels 130. For the example configuration shown in FIG. 3, at least one of the cooling channels 130 extends at least partially along the pressure side wall 24, and wherein at least one of the cooling channels 130 extends at least partially along the suction side wall 26. Beneficially, this configuration cools a portion of the suction side and a portion of the pressure side of the component in the relatively thin section near the trailing edge. It should be noted that although the cross-section depicted in FIG. 3 shows only one cooling channel extending along the pressure side and only one cooling channel extending along the suction side, there may be multiple cooling channels extending along each of the respective sides 24, 26, where the cooling channels are located at different cross-sections taken along the height of the component. As used here, the "height" of the component is measured along the radial direction of the airfoil. For particular arrangements (for example as shown in FIG. 3), the cooling channel 130 extending at least partially along the pressure side wall 24 and the cooling channel 130 extending at least partially along the suction side wall 26 are aligned. Namely, this pair of cooling channels is located within the same cross-section taken along the height (that is, in the radial direction) of the component. However, for other configurations (not shown), wherein the channel 130 extending at least partially along the pressure side wall 24 and the channel 130 extending at least partially along the suction side wall 26 are offset. Namely, this pair of cooling channels would not be located within the same cross-section taken along the radial direction (or height) of the component. Instead, the cooling channels would be in different cross-sections taken along the radial direction of the component. For still other arrangements, the pressure side cooling channel and the suction side cooling channel may have different and non-orthogonal orientations relative to the trailing edge, such that the channels do not lie in parallel cross sections. In other words, a cooling channel on either side and in any of the several illustrated configurations may traverse over more than one airfoil section, where a section is defined as the airfoil portion at a constant radial height.

More particularly, for the example arrangement shown in FIG. 3, the substrate 110 further defines multiple access channels 140. As shown in FIG. 3, at least one of the access channels 140 extends between and provides fluid communication between a respective hollow, interior space 114 and the cooling channel 130 that extends at least partially along the pressure side wall 24, and at least one of the access channels 140 extends between and provides fluid communication between a respective hollow, interior space 114 and the cooling channel 130 that extends at least partially along the suction side wall 26. As indicated in FIG. 7, for example, each access channel 140 intersects a base 134 of the respective cooling channel 130.

Figure 4:
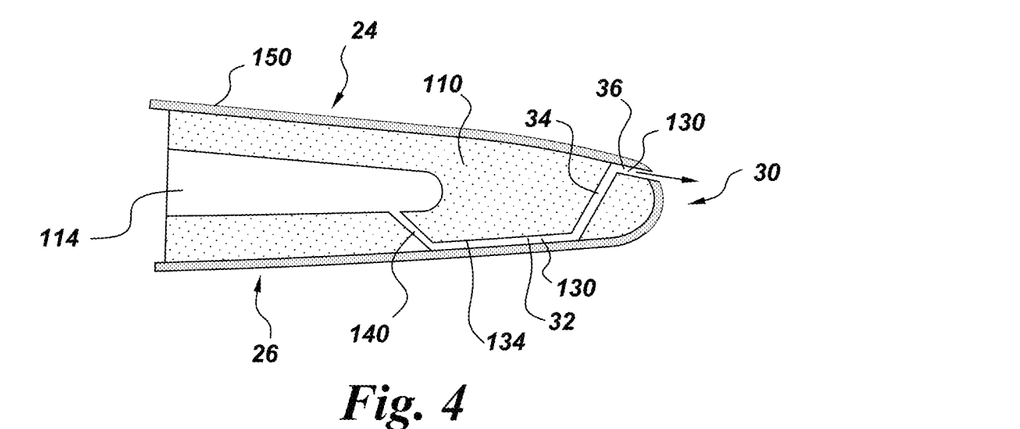
FIG. 4 schematically depicts, in cross-sectional view, another arrangement for cooling the trailing edge of an airfoil, with a cooling channel initially on the suction side wall and crossing over to cool the pressure side wall.

For the example configuration shown in FIG. 4, at least one of the cooling channels 130 comprises an inlet portion 32 that extends partially along the suction side wall 26, an outlet portion 36 that extends partially along the pressure side wall 24, and an intermediate portion 34 that extends between the inlet and outlet portions 32, 36 of the cooling channel 130. It should be noted that although FIG. 4, shows the outlet of the cooling channel exiting at the trailing edge 30 of the component, the outlet need only exit in the vicinity of the trailing edge, as defined above. As indicated in FIG. 4, for this configuration, the substrate 110 further defines at least one access channel 140 that extends between and provides fluid communication between a respective hollow, interior space 114 and the inlet portion 32 of the cooling channel 130. As schematically depicted in FIG. 7, for example, the access channel 140 intersects the base 134 of the inlet portion 32 of the cooling channel 130. Beneficially, this configuration cools a portion of the suction side and is routed over to the pressure side for discharge with lower aero mixing losses, relative to the aero mixing losses that would result if the coolant discharges on the suction side of the airfoil trailing edge where the hot gases are at their maximum local velocity. Further, by crossing from the suction side, through the solid region, to the pressure side, the microchannel cools the solid region near the trailing edge.

Figure 5:
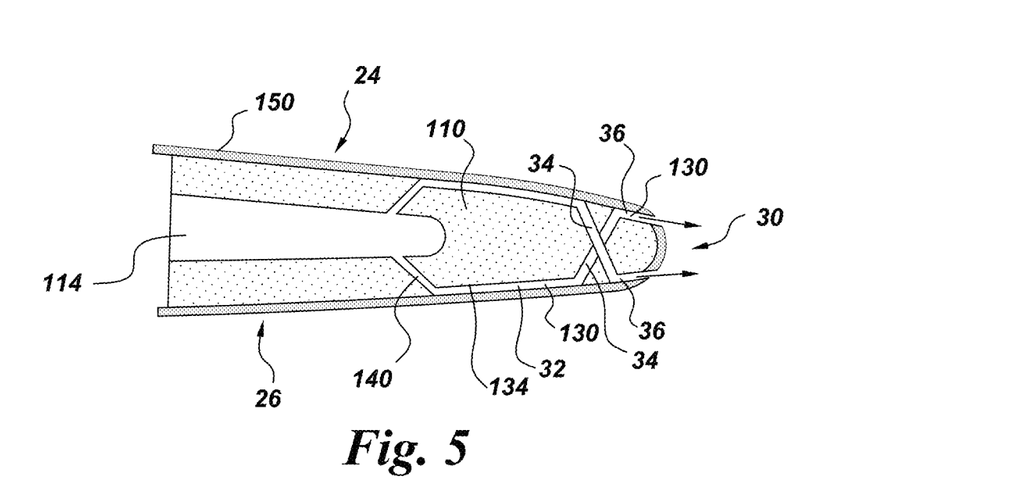
FIG. 5 schematically depicts, in cross-sectional view, a third arrangement for cooling the trailing edge of an airfoil, with a cooling channel that crossed from the suction to the pressure side wall and another cooling channel that crossed from the pressure to the suction side wall.

For the example configuration shown in FIG. 5, the component 100 comprises at least two channels 130 for cooling the trailing edge 30 of the component 100. As shown in FIG. 5, at least one of the channels 130 comprises an inlet portion 32 that extends partially along the suction side wall 26, an outlet portion 36 that extends partially along the pressure side wall 24, and an intermediate portion 34 that extends between the inlet and outlet portions 32, 36 of the cooling channel 130. As shown in FIG. 5, at least another one of the cooling channels 130 comprises an inlet portion 32 that extends partially along the pressure side wall 24, an outlet portion 36 that extends partially along the suction side wall 26, and an intermediate portion 34 that extends between the inlet and outlet portions 32, 36 of the cooling channel 130. It should be noted that although FIG. 5, shows the outlets of the cooling channels exiting at the trailing edge 30 of the component, the outlets need only exit in the vicinity of the trailing edge, as defined above. As shown in FIG. 5, the substrate 110 further defines at least two access channels 140 that extend between and provides fluid communication between a respective hollow, interior space 114 and the respective inlet portions 32 of the cooling channels 130. Each access channel 140 intersects a base 134 of the inlet portion 32 of the respective cooling channel 130. Although not expressly shown in FIG. 5, the channel 130 may include multiple intermediate portions that extend at least partially across the trailing edge portion of the substrate to connect the inlet and outlet portions. For example, the intermediate portions may form half of an 'M' or 'W' shape (not shown). For particular configurations, the channel 130 with the inlet portion 32 that extends partially along the suction side wall 26, and the channel 130 with the inlet portion 32 that extends partially along the pressure side wall 24 are offset. Namely, the two channels are disposed in different cross sections taken along the radial direction (height) of the component.

Figure 6:
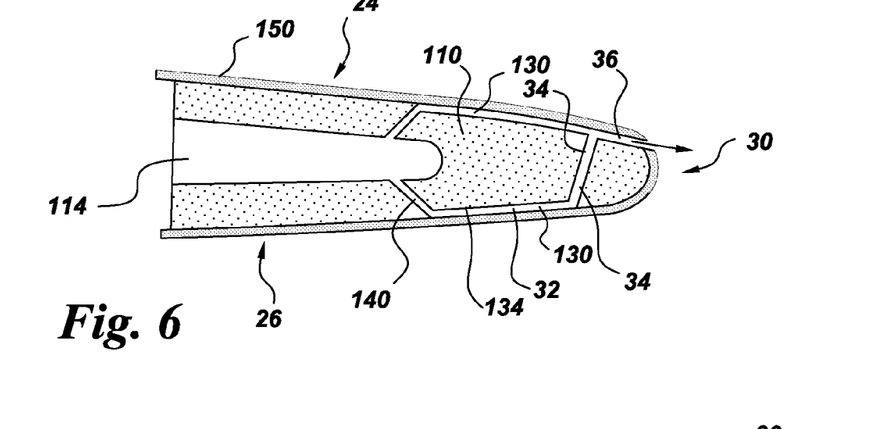
FIG. 6 schematically depicts, in cross-sectional view, a fourth arrangement for cooling the trailing edge of an airfoil, with cooling channels running along the pressure and suction side walls, where the cooling channel extending along the suction side wall crosses to the pressure side wall.

For the example configuration shown in FIG. 6, at least one of the channels 130 comprises an inlet portion 32 that extends partially along the suction side wall 26, an outlet portion 36 that extends at least partially along the pressure side wall 24, and an intermediate portion 34 that extends between the inlet and outlet portions 32, 36 of the cooling channel 130. As shown in FIG. 6, at least another of the channels 130 extends at least partially along the pressure side wall 24. It should be noted that although FIG. 6, shows the outlet of the cooling channel exiting at the trailing edge 30 of the component, the outlet need only exit in the vicinity of the trailing edge, as defined above. As shown in FIG. 6 the substrate 110 further defines at least two access channels 140, where at least one of the access channels 140 extends between and provides fluid communication between a respective hollow, interior space 114 and the respective inlet portion 32 of the cooling channel 130 that extends partially along the suction side wall 26 and intersects a base 134 of the respective inlet portion 32, and wherein at least another of the access channels 140 extends between and provides fluid communication between a respective hollow, interior space 114 and the cooling channel 130 that extends at least partially along the pressure side wall 24 and intersects a base 134 of the respective cooling channel 130. Beneficially, by crossing through the solid region to the other side, the cooling channels provide additional cooling within the solid region of the substrate near the trailing edge, as well as producing lower aero mixing losses.

For certain arrangements of the channel configuration shown in FIG. 6, the channel 130 with the inlet portion 32 that extends partially along the suction side wall 26 and the other channel 130 that extends at least partially along the pressure side wall 24 are offset. Namely, the two channels are disposed in different cross sections taken along the radial direction (height) of the component.

For other arrangements of the channel configuration shown in FIG. 6, the channel 130 with the inlet portion 32 that extends partially along the suction side 26 and the other channel 130 that extends at least partially along the pressure side 24 are aligned, such that the outlet portion 36 is part of the other channel 130 that extends at least partially along the pressure side 24. That is, the intermediate portion 34 intersects the other (pressure side) channel 130, as shown in FIG. 6.

Figure 9:
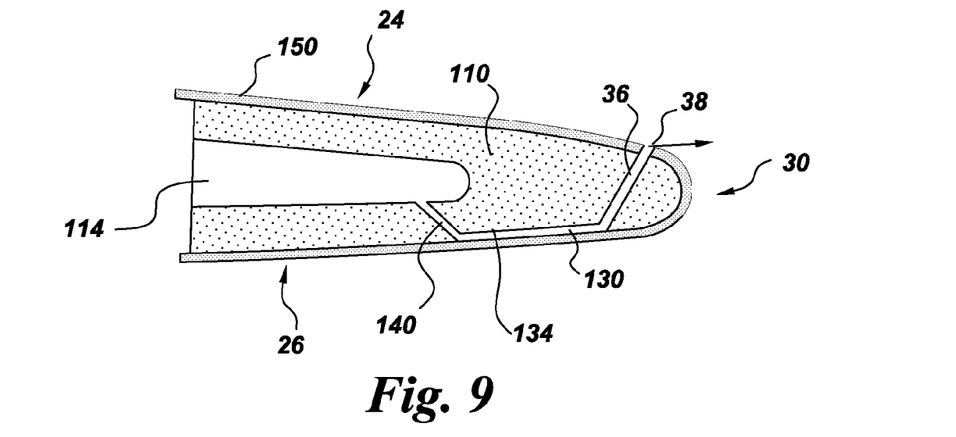
FIG. 9 schematically depicts, in cross-sectional view, another example arrangement for cooling the trailing edge of an airfoil, with a cooling channel running along the suction side wall and crossing toward the pressure side wall.

For the example configuration shown in FIG. 9, at least one cooling channel 130 extends at least partially along the suction side wall 26 and includes an outlet portion 38 that intersects the pressure side wall 24 in the vicinity of the trailing edge 30 of the component 100. It should be noted that although FIG. 9, shows the outlet 38 being at the trailing edge 30 of the component, the outlet 38 need only be in the vicinity of the trailing edge, as defined above. As shown in FIG. 9, the substrate 110 further defines at least one access channel 140 that extends between and provides fluid communication between a respective hollow, interior space 114 and the respective cooling channel 130. As shown in FIG. 9, each access channel 140 intersects a base 134 of the respective cooling channel 130.

As noted above, the grooves 132 may have a number of different geometries. For the arrangements shown in FIGS. 7 and 8, each groove 132 has an opening 136, and each groove 132 narrows at the opening 136 of the groove 132 and thus comprises a re-entrant shape, such that each cooling channel 130 comprises a re-entrant shaped cooling channel 130. Re-entrant shaped grooves are described in U.S. Pat. No. 8,387,245. For particular configurations, the base 134 of a re-entrant shaped groove 132 is at least 2 times wider than the top 136 of the respective groove 132. For example, if the base 134 of the groove 132 is 0.75 millimeters, the top 136 would be less than 0.375 millimeters in width, for this configuration. For more particular configurations, the base 134 of the re-entrant shaped groove 132 is at least 3 times wider than the top 136 of the respective groove 132, and still more particularly, the base 134 of the re-entrant shaped groove 132 is in a range of about 3-4 times wider than the top 136 of the respective groove 132. Beneficially, a large base to top ratio increases the overall cooling volume for the micro-channel 130, while facilitating the deposition of the coating 150 over the groove 132 (without the use of a sacrificial filler) without having the coating 150 fill the groove 132.

Figure 8:
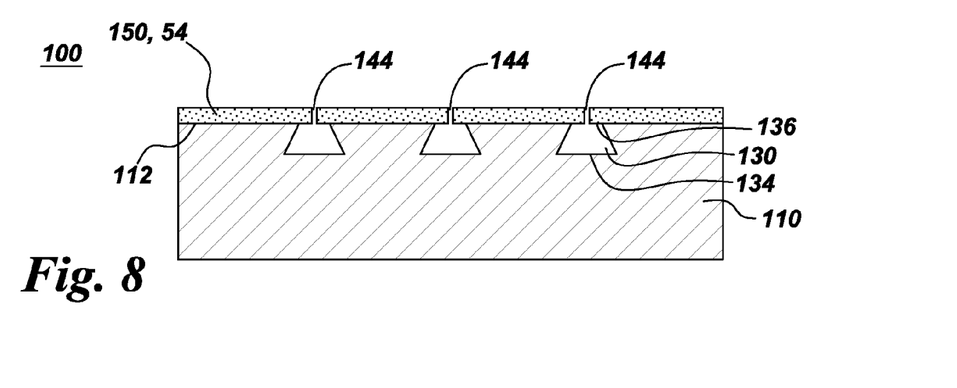
FIG. 8 is a cross-sectional view of three re-entrant shaped channels, where porous slots extend through a structural coating.

For certain configurations, the structural coating 54 completely bridges the respective grooves 132, such that the coating 150 seals the respective micro-channels 130. For other configurations, however, the structural coating 54 defines one or more permeable slots 144 (for example, porosity in the coating or a gap in the coating), such that the structural coating does not completely bridge each of the one or more grooves 132, as indicated in FIG. 8. Although FIG. 8 schematically depicts the slots 144 as having a uniform and straight geometry, typically each slot 144 has an irregular geometry, with the width of the slot 144 varying, as the coating 150 is applied and builds up a thickness. Initially, as the first part of the coating 150 is applied to the substrate 110, the width of the slot 144 may be as much as 50% of the width of the top 136 of the micro-channel 130. The slot 144 may then narrow down to 5% or less of the width of the top 136, as the coating 150 is built up. For particular examples, the width of slot 144, at its narrowest point, is 5% to 20% of the width of the respective micro-channel top 136. In addition, the slot 144 may be porous, in which case the "porous" slot 144 may have some connections, that is some spots or localities that have zero gap. Beneficially, the slots 144 provide stress relief for the coating 150.

Beneficially, by disposing cooling channels in the vicinity of the trailing edge, micro-channel cooling can be provided to cool the trailing edge region during operation, which facilitates the use of relatively thin trailing edges and provides relatively higher cooling effectiveness. Depending on the specific configuration, trailing edges with thicknesses reduced by up to fifty percent may be employed. As used here, the "thickness" of the trailing edge is defined as the physical thickness measured from pressure side to suction side between the points at which the trailing edge radius of curvature exists. The resulting aerodynamic improvement of the thinner trailing edges, taken together with the improved cooling effectiveness, can reduce specific fuel consumption (SFC) for aircraft engines, and improve combined cycle efficiency for stationary (land-based) gas turbines.

In addition, using micro-channel cooling to cool the trailing edge, instead of the above-described conventional techniques, facilitates keeping the end portion of the trailing edge of a higher solidity. This, in turn, increases the service lifetime of the micro-channel cooled component relative to its conventionally cooled counterpart.

A method of forming cooling channels 130 in the vicinity of a trailing edge 30 of a component 100 is described with reference to FIGS. 2-9. As described above with reference to FIGS. 2 and 3, the component 100 includes a substrate 110 having an outer surface 112 and an inner surface 116, where the inner surface 116 defines at least one hollow, interior space 114, and the outer surface 112 of the substrate 110 defines a pressure side wall 24 and a suction side wall 26. The pressure and suction side walls 24, 26 are joined together at a leading edge 28 and at the trailing edge 30 of the component 100. As indicated in FIGS. 3-6, the method includes forming at least one groove in the outer surface 112 of the substrate 110 that extends at least partially along the pressure or suction side walls 24, 26 in the vicinity of the trailing edge 30 of the component 100. Typically and as discussed above, the method further includes casting the substrate 110 prior to forming the grooves 132 in the outer surface 112 of the substrate 110.

As indicated in FIGS. 3-6, the method further includes forming at least one access hole 140 in the substrate 110, where each access hole 140 is formed through the base 134 of a respective groove 132, to connect the groove 132 in fluid communication with the respective hollow interior space 114. As noted above, techniques for forming the access holes are provided in commonly assigned U.S. Pat. No. 9,206,696, Ronald S. Bunker et al. For example, the access holes may be formed by abrasive liquid jet machining. Further, the interior access holes 140 may be drilled either as a straight hole of constant cross section, a shaped hole (elliptical etc.), or a converging or diverging hole.

As indicated in FIGS. 2, 3, 7, and 8, for example, the method further includes disposing a coating 150 over at least a portion of the outer surface 112 of the substrate 110. Coating 150 and example deposition techniques for disposing coating 150 are described above. However, for particular processes, the step of disposing the coating 150 over at least the portion of the outer surface 112 of the substrate 110 comprises performing an ion plasma deposition. For particular configurations, the coating 150 comprises a superalloy. For particular processes, the step of disposing the coating 150 over at least the portion of the outer surface 112 of the substrate 110 comprises performing a thermal spray process. Example thermal spray processes include high velocity oxygen fuel spraying (HVOF) and high velocity air fuel spraying (HVAF). For particular processes, the step of disposing the coating 150 over at least the portion of the outer surface 112 of the substrate 110 comprises performing a low pressure plasma spray (LPPS) process. As discussed above, the coating 150 comprises at least a structural coating 54 that extends over the groove(s) 132, such that the groove(s) 132 and the structural coating 54 together define one or more channels 130 for cooling the trailing edge 30 of the component 100.

As discussed above, for particular configurations, the grooves are re-entrant shaped. For particular processes, the re-entrant shaped grooves 132 are formed by directing an abrasive liquid jet 160 at the surface 112 of the substrate 110, as discussed in U.S. Pat. No. 8,387,245, Bunker et al. and as illustrated, for example, in FIGS. 10-12. For example, the re-entrant shaped grooves 132 may be formed by directing the abrasive liquid jet 160 at a lateral angle relative to the surface 112 of the substrate 110 in a first pass of the abrasive liquid jet 160 (FIG. 10) and then making a subsequent pass at an angle substantially opposite to that of the lateral angle (FIG. 11). For particular processes, the step of forming the re-entrant shaped grooves 132 may further comprise performing at least one additional pass (FIG. 12) where the abrasive liquid jet 160 is directed toward the base 134 of the groove 132 at one or more angles between the lateral angle and the substantially opposite angle, such that material is removed from the base 134 of the groove 132. More generally, the re-entrant shaped grooves 132 may be formed using one or more of an abrasive liquid jet, plunge electrochemical machining (ECM), electric discharge machining (EDM) with a spinning electrode (milling EDM) and laser machining.

As noted above, using micro-channel cooling for the trailing edge region of the airfoil, facilitates the use of relatively thinner trailing edges, which improves the aerodynamic efficiency of the airfoil. In addition, the micro-channel cooling of the trailing edge region increases the cooling effectiveness, relative to conventional means for cooling the trailing edge region. The combination of thinner trailing edges and increased cooling effectiveness translates into reduced SFC for aircraft engines and improved combined cycle efficiency for stationary (land based) gas turbines. In addition, the use of micro-channels to cool the trailing edge regions, facilitates keeping the end portion of the trailing edge of a higher solidity, which will improve the service lifetime of the cooled component.

Although only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A component comprising:
   a substrate comprising an outer surface and an inner surface, wherein the inner surface defines at least one hollow, interior space, wherein the outer surface of the substrate defines a pressure side wall and a suction side wall, wherein the pressure and suction side walls are joined together at a leading edge and at a trailing edge of the component, wherein the outer surface defines one or more substantially axially oriented grooves that extend along the pressure or suction side walls to the trailing edge of the component, and wherein each groove is in fluid communication with a respective hollow, interior space; and
   a coating comprised of a superalloy disposed over at least a portion of the outer surface of the substrate, wherein the coating comprises at least one structural coating, wherein the at least one structural coating extends over the one or more grooves, such that the one or more grooves and the at least one structural coating together define one or more channels for cooling the trailing edge of the component, and
   wherein each of the one or more channels comprises an outlet portion that intersects one of the pressure side wall or the suction side wall at the trailing edge and extending through the coating to define an outlet at the trailing edge.

2. The component of claim 1, wherein the component comprises a turbine airfoil, and wherein the substrate further defines at least one access channel that extends between and provides fluid communication between a respective hollow, interior space and at least one cooling channel, wherein the respective access channel intersects a base of the respective cooling channel.

3. The component of claim 1, wherein at least one of the channels extends at least partially along the pressure side wall, and wherein at least one of the channels extends at least partially along the suction side wall.

4. The component of claim 3, wherein the channel extending at least partially along the pressure side wall and the channel extending at least partially along the suction side wall are aligned.

5. The component of claim 3, wherein the channel extending at least partially along the pressure side wall and the channel extending at least partially along the suction side wall are offset.

6. The component of claim 3, wherein the substrate further defines a plurality of access channels, wherein at least one of the access channels extends between and provides fluid communication between a respective hollow, interior space and the at least one cooling channel that extends at least partially along the pressure side wall, wherein at least one of the access channels extends between and provides fluid communication between a respective hollow, interior space and the at least one cooling channel that extends at least partially along the suction side wall, and wherein each access channel intersects a base of the respective cooling channel.

7. The component of claim 1, wherein at least one cooling channel extends at least partially along the suction side wall, wherein the substrate further defines at least one access channel that extends between and provides fluid communication between a respective hollow, interior space and the respective cooling channel, and wherein each access channel intersects a base of the respective cooling channel.

8. The component of claim 1, wherein each groove has an opening, and wherein each groove narrows at the opening of the groove and thus comprises a re-entrant shaped groove, such that each cooling channel comprises a re-entrant shaped cooling channel.

9. The component of claim 1, wherein the at least one structural coating seals each groove.

10. A method of forming cooling channels at a trailing edge of a component comprising a substrate having an outer surface and an inner surface, wherein the inner surface defines at least one hollow, interior space, wherein the outer surface of the substrate defines a pressure side wall and a suction side wall, wherein the pressure and suction side walls are joined together at a leading edge and at the trailing edge of the component, the method comprising:
   forming at least one substantially axially oriented groove in the outer surface of the substrate that extends along the pressure or suction side walls to the trailing edge of the component;
   forming at least one access hole in the substrate, wherein each access hole is formed through the base of a respective one of the one or more grooves, to connect the groove in fluid communication with the respective hollow interior space; and
   disposing a coating comprised of a superalloy over at least a portion of the outer surface of the substrate, wherein the coating comprises at least one structural coating, wherein the at least one structural coating extends over the one or more grooves, such that the one or more grooves and the at least one structural coating together define one or more channels for cooling the trailing edge of the component, and
   wherein each of the one or more channels comprises an outlet portion that intersects one of the pressure side wall or the suction side wall at the trailing edge and extends through the coating to define an outlet at the trailing edge.

11. The method of claim 10, further comprising casting the substrate prior to forming the grooves in the outer surface of the substrate.

12. The method of claim 10, wherein each groove has an opening, and wherein each groove narrows at the opening of the groove and thus comprises a re-entrant shaped groove, such that each cooling channel comprises a re-entrant shaped cooling channel.

13. The method of claim 12, wherein the re-entrant shaped grooves are formed by directing an abrasive liquid jet at the surface of the substrate.

* * * * *